Feb. 8, 1927.　　　　　　　　　　　　　　　1,616,979
J. W. MacCLATCHIE
DEEP WELL PUMP OPERATING MECHANISM
Filed Jan. 18, 1926
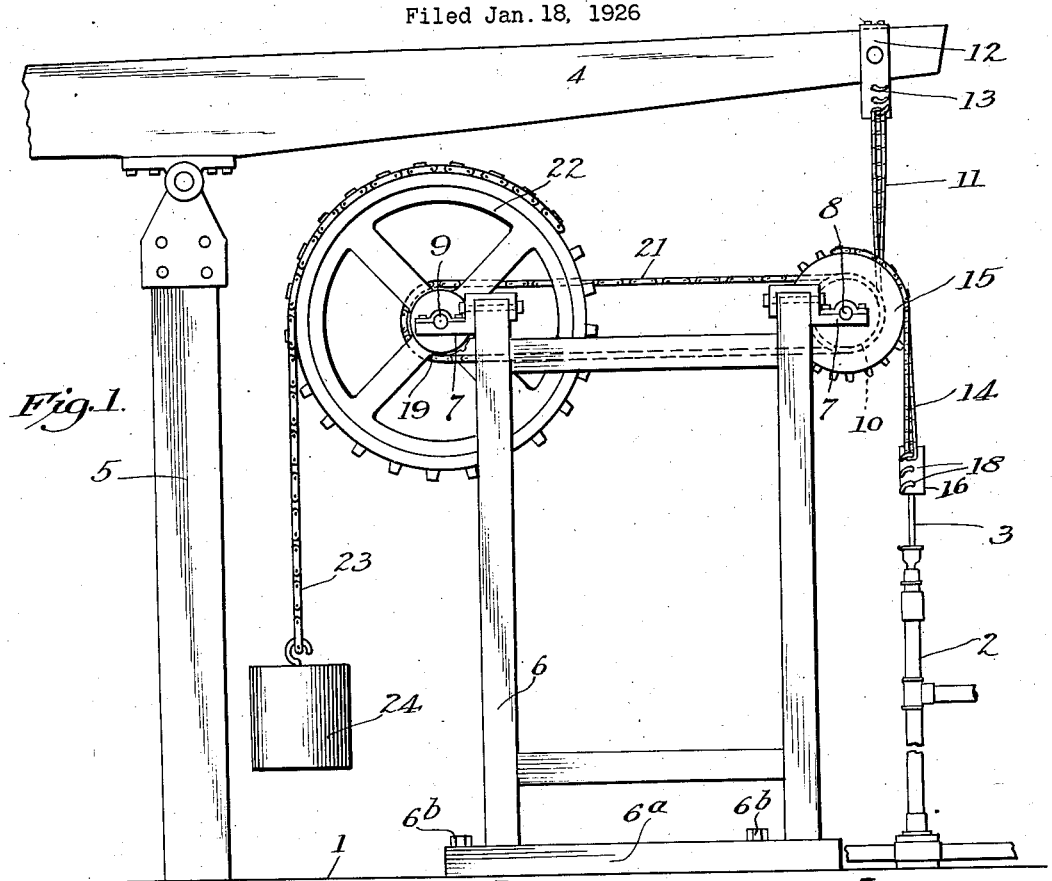
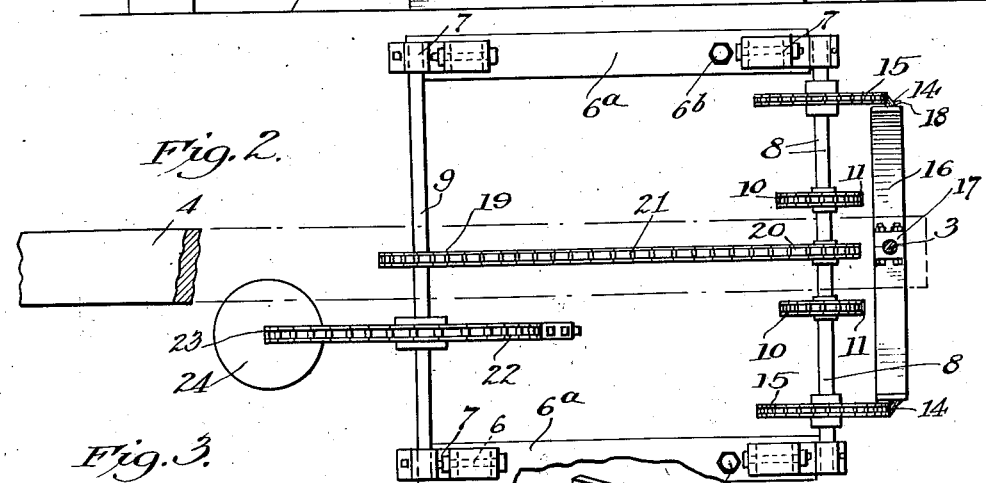
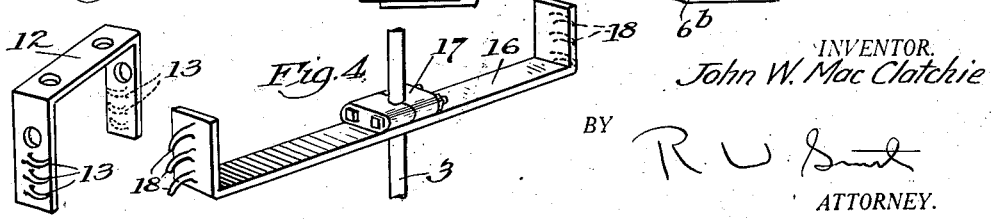
INVENTOR.
John W. MacClatchie
BY
ATTORNEY.

Patented Feb. 8, 1927.

1,616,979

UNITED STATES PATENT OFFICE.

JOHN W. MacCLATCHIE, OF COMPTON, CALIFORNIA.

DEEP-WELL-PUMP-OPERATING MECHANISM.

Application filed January 18, 1926. Serial No. 81,968.

It is the object of this invention to provide a long stroke for the sucker rod of a deep well pump; and to counter-balance the sucker rod for operation with minimum power.

More particularly it is the object of the invention to provide an operating connection between a usual walking beam and the sucker rod, which increases the stroke of the pump without increase in the oscillation of the walking beam, and which also relieves the strain on the walking beam and its drive mechanism by counter-balancing the reciprocation of the sucker rod.

The invention will be readily understood from the following description of the accompanying drawings, in which:

Fig. 1 is a side elevation of the mechanism.

Fig. 2 is a top plan view of the same.

Figs. 3 and 4 are perspective views of the saddle and yoke mounted on the walking beam and on the polished rod of the pump mechanism.

In the drawings a portion of a well rig is shown comprising a derrick floor 1, with the well tubing 2 and the polished rod 3 of the pump mechanism, and walking beam 4 oscillating on the Samson post 5.

A frame 6 is mounted on the derrick floor between the Samson post and the reciprocating polished rod 3; and this frame supports bearings 7 for transverse horizontal shafts 8 and 9. The shaft 8 is below the walking beam and adjacent the polished rod above the same, and the shaft 9 is parallel to and horizontally spaced from the shaft 8 adjacent the Samson post.

Swinging of the walking beam oscillates the shaft 8 through sprocket wheels 10 which are keyed on the shaft and which are engaged by sprocket chains 11. The chains are fixed at one end to the sprocket wheels and their opposite ends are connected to the walking beam. For this purpose a saddle 12 is fixed on the end of the walking beam, and the sides of the saddle which extend downwardly along the sides of the walking beam are provided with vertically spaced hooks 13 adapted to be selectively engaged by the chains 11 for adjusting the operating connection.

The polished rod 3 is reciprocated by oscillation of shaft 8, through the medium of sprocket chains 14 which are fixed at one end to sprocket wheels 15 keyed on the shaft. The opposite ends of the chains are connected to the respective ends of a yoke 16 which is mounted on the polished rod and fixed thereto by a usual clamp 17. Hooks 18 are preferably vertically spaced on the ends of the yoke for selective engagement by the chains 14 in order to adjust the connections.

The shaft 9 is oscillated in accordance with the movement of shaft 8, through sprocket wheels 19—20 keyed on the respective shafts and engaged by an endless sprocket chain 21.

A relatively large sprocket wheel 22 is also keyed on shaft 9, and a depending sprocket chain 23 is fixed at one end to the wheel 22 and is provided at its lower end with a counter-weight 24.

In practice the sprocket wheels 10 and 15 are of a relative size to produce a gear ratio affording any desired increase in the stroke of the polished rod; and the member 24 is of such weight as to cooperate with the gear ratio between sprocket wheels 22 and 19 for counter-balancing the reciprocation of the sucker rod so that the walking beam may be operated with minimum power. As a consequence the walking beam and its driving connection is relieved of the strain incident to operation of the pump, and practically the entire operating strain is carried by the frame 6 which may be of the desired sturdy construction.

It will be noted that the saddle and yoke constructions 12 and 16 provide dual connections between the walking beam and the reciprocating polished rod, so that in the event of one or the other of the chains 11 or 14 breaking, the sucker rod will still be held against dropping in the well. The hooks 13 and 18 at the respective ends of saddle 12 and yoke 16, preferably extend in opposite directions as shown in Figs. 3 and 4, so that the strain of the respective chains 11 and 14 will be counter-balanced to prevent any tilting tendency of the saddle or yoke.

The frame 6 which is mounted on the derrick floor, preferably includes supporting skids 6ª whereby the frame may be readily slid along the derrick floor for removal when the pump is not in use. After the frame is in position for use, it may be detachably held by bolts 6ᵇ.

I claim:

1. An operating connection between a walking beam and a reciprocating pump rod comprising a frame, reduction gearing between the walking beam and pump rod supported by the frame, and a counter-balance for the pump rod supported by the frame.

2. An operating connection between a walking beam and reciprocating pump rod comprising a frame, a shaft journaled on said frame, a sprocket fixed on the shaft, an operating connection between the sprocket and the walking beam, a sprocket of increased diameter fixed on the shaft, and an operating connection between the second sprocket and the pump rod.

3. An operating connection between a walking beam and reciprocating pump rod comprising a frame, a shaft journaled on said frame, a sprocket fixed on the shaft, an operating connection between the sprocket and the walking beam, a sprocket of increased diameter fixed on the shaft, an operating connection between the second sprocket and the pump rod, and a counter-balance fixed to the shaft.

4. An operating connection between a walking beam and a reciprocating pump rod comprising a saddle adapted for mounting on the walking beam, a yoke adapted for mounting on the pump rod, a frame, reduction gearing supported by the frame, and dual operating connections between the reduction gearing and the saddle and yoke respectively.

5. An operating connection between a walking beam and reciprocating pump rod comprising a frame, a shaft journaled on said frame, a sprocket fixed on the shaft, an operating connection between the sprocket and the walking beam, a sprocket of increased diameter fixed on the shaft, an operating connection between the second sprocket and the pump rod, reduction gearing supported by the frame and operated by the shaft, a counter-balance, and an operating connection between the counter-balance and the reduction gearing.

6. An operating connection between a walking beam and reciprocating pump rod including a transverse member on one of said parts, hooks on the respective ends of the transverse member curving in opposite directions, and dual connections between the other of said parts and the hooks at the respective ends of the transverse member.

In testimony whereof I have affixed my signature to this specification.

JOHN W. MacCLATCHIE.